(12) United States Patent
Gibb

(10) Patent No.: US 6,491,056 B2
(45) Date of Patent: Dec. 10, 2002

(54) SPRINKLER ALARM TEST AND DRAINAGE DEVICE FOR FIRE PROTECTION SYSTEMS

(75) Inventor: John Gibb, Bolton (CA)

(73) Assignee: Victaulic Company of America, Easton, PA (US)

( * ) Notice: Subject to any disclaimer, the term of this patent is extended or adjusted under 35 U.S.C. 154(b) by 0 days.

(21) Appl. No.: 09/753,924

(22) Filed: Jan. 2, 2001

(65) Prior Publication Data

US 2002/0083982 A1 Jul. 4, 2002

(51) Int. Cl.⁷ ................................................ F16K 37/00
(52) U.S. Cl. ................... 137/271; 137/559; 137/630.14; 137/630.22; 251/113; 73/168
(58) Field of Search ................................ 137/271, 559, 137/601.2, 630, 630.14, 630.15, 630.22; 251/113, 106; 73/168

(56) References Cited

U.S. PATENT DOCUMENTS

| | | | | |
|---|---|---|---|---|
| 702,336 A | * | 6/1902 | Ball ........................ | 137/601.2 |
| 893,527 A | * | 7/1908 | Lawler .................... | 137/601.2 |
| 961,220 A | * | 6/1910 | Everson et al. ............ | 251/113 |
| 2,160,657 A | * | 5/1939 | Haynes ...................... | 251/113 |
| 2,360,612 A | * | 10/1944 | Ludeman ................ | 137/630.22 |
| 2,403,427 A | * | 7/1946 | Ludeman ................ | 137/630.14 |
| 2,841,174 A | * | 7/1958 | Frye ........................ | 137/601.2 |
| 3,111,141 A | * | 11/1963 | Hughes ................ | 137/630.22 |
| 3,211,419 A | * | 10/1965 | Klinger-Lohr ......... | 137/630.15 |
| 3,289,694 A | * | 12/1966 | Frye ........................ | 137/601.2 |
| 3,624,753 A | * | 11/1971 | Brumm ................ | 137/630.14 |
| 4,274,444 A | * | 6/1981 | Ruyak .................... | 137/630.14 |
| 4,643,224 A | * | 2/1987 | Rung et al. ................ | 137/559 |
| 4,655,078 A | * | 4/1987 | Johnson ...................... | 137/559 |
| 4,704,983 A | * | 11/1987 | Rung .......................... | 137/559 |
| 4,729,403 A | * | 3/1988 | Roche ........................ | 137/559 |
| 4,971,109 A | * | 11/1990 | McHugh .................... | 137/559 |
| 5,052,655 A | * | 10/1991 | Ackroyd .................... | 251/113 |
| 5,944,051 A | * | 8/1999 | Johnson ...................... | 137/559 |
| 6,196,262 B1 | * | 3/2001 | Giacomini ................ | 137/559 |
| 6,341,622 B1 | * | 1/2002 | McHugh .................... | 137/523 |

* cited by examiner

Primary Examiner—John Rivell
(74) Attorney, Agent, or Firm—Abelman Frayne & Schwab

(57) ABSTRACT

A combined alarm test and drain device for a fire protection sprinkler system is disclosed. The apparatus is based on a globe valve and has certain specific modifications for the purposes of draining the system and allowing for flow through a specifically sized orifice under conditions simulating the flow through a sprinkler head having the same orifice size. Fluid flow through the apparatus occurs alternatively under a first set of conditions in a system alarm test mode of operation of the apparatus, and under a second set of conditions in a system fluid drainage mode of operation of the apparatus. A combination of mechanical and hydraulic forces are utilized to control opening and closing of the valve in both the alarm test and system fluid drainage modes of operation. The mechanical force is provided by a spring and the hydraulic force is provided by a fluid pressure differential.

32 Claims, 8 Drawing Sheets

SPRINKLER ALARM TEST AND DRAINAGE DEVICE FOR FIRE PROTECTION SYSTEMS

FIELD OF THE INVENTION

This invention relates generally to the field of sprinkler systems for fire protection systems. More particularly, this invention relates to alarm test and drain devices for fire protection sprinkler systems, and specifically to dual-function devices in which the alarm test and drain functions are combined.

BACKGROUND OF THE INVENTION

Some alarm test devices for sprinkler type fire protection systems combine, into a single device, both a system test function, for testing to ensure that the system is activated and will respond to a real triggering event, namely, a fire, by delivering extinguishing fluid, usually water, to the sprinkler heads; and a system drain function, for draining all of the extinguishing fluid from a "wet", or normally fluid-filled type sprinkler system, such as occurs when the system must be temporarily taken out of service for repairs; or in either a "wet" or a "dry" system, after the system has been actuated in response to a fire and the system piping is still at least partially filled with residual extinguishing fluid, so as to be able to drain the remaining fluid in order to reset the system. Some apparatus also incorporates gauge glasses or similar observation devices to enable visual inspection of the status of the liquid flow through the system. These combination devices, also known as inspection, test and drain devices, are used to provide a connection for testing the system's alarm equipment, and are also used to drain sprinkler type fire protection systems.

Certain such combined devices are already known in the art. For example, U.S. Pat. No. 4,741,361 to McHugh for "Valve and Arrangement for Fire Suppression Water Sprinkler System", U.S. Pat. No. 4,655,078 to Johnson for "Sprinkler Drain and Test Valve", and U.S. Pat. No. 4,643,224 to Rung et al for Alarm Test Device for a Sprinkler System, all disclose combined alarm test and drain apparatus.

In the apparatus of both McHugh and Johnson, the sealing element and drain connection are effected by means of a rotary member in the form of a ball, incorporating modifications to a conventional ball valve design. In contrast, the apparatus of Rung et al, although enclosed in a single housing, incorporates two separate valves, one for the purpose of draining the system and the other for allowing flow through a separate test orifice to test for fluid flow as if to a sprinkler head when actuated. Generally, previously known apparatus, especially that requiring two separate valves, has the disadvantage of being bulky or requiring a special orientation or configuration when placed in the system piping, thereby occupying a considerable amount of space, where typically space is very limited.

SUMMARY OF THE INVENTION

Accordingly, the present invention provides a combined alarm test and drainage apparatus for use in sprinkler fire protection systems, wherein a single modified valve is used for both the test and drain functions, and which occupies very little space and can easily be connected to the piping of a sprinkler type fire protection system. The apparatus is based on a globe valve and has certain specific modifications for the purposes of draining the system and allowing for flow through a specifically sized orifice under conditions simulating the flow through a sprinkler head having the same orifice size. Fluid flow through the apparatus occurs alternatively under a first set of test actuation conditions in a system alarm test mode of operation of the apparatus, and under a second set of fluid drainage actuation conditions in a system fluid drainage mode of operation of the apparatus. A combination of mechanical and hydraulic forces are utilized to control opening and closing of the valve in both the alarm test and system fluid drainage modes of operation. The mechanical force is provided by a spring and the hydraulic force is provided by a fluid pressure differential. When the apparatus is performing the system alarm test function under the first set of test actuation conditions, the valve opens a first size outlet opening, and when the apparatus is performing the system fluid drainage function under the second set of drainage actuation conditions, the valve opens a second size outlet opening, larger than the first size opening. When the apparatus is in the system alarm test mode of operation, a valve actuation member is positioned to seal the second size opening of the valve, and fluid flows into a fluid chamber through a fluid chamber inlet opening, a fluid chamber outlet opening is unsealed, and fluid flows out through the fluid chamber outlet opening; and when the apparatus is in the system drainage mode of operation, the valve actuation member is moved to unseal the second size opening of the valve.

Brief Description of the Drawings

FIG. 2b showing the apparatus in a test position; and

FIG. 2c showing the apparatus in a drain position.

FIG. 3b showing a front side view of the device; and

DETAILED DESCRIPTION OF PREFERRED EMBODIMENTS OF THE INVENTION

Referring now generally to FIG. 2, which shows an alarm test and drain device for a sprinkler type fire protection system according to the present invention, the apparatus of the present invention incorporates a globe valve type device that has been modified for use in a sprinkler type fire control system, and which has certain further specific modifications made for the purposes of draining the system and allowing liquid flow through a specifically sized orifice, under conditions simulating the flow of extinguishing fluid through a downstream sprinkler head having the same orifice size.

Figure 2A:
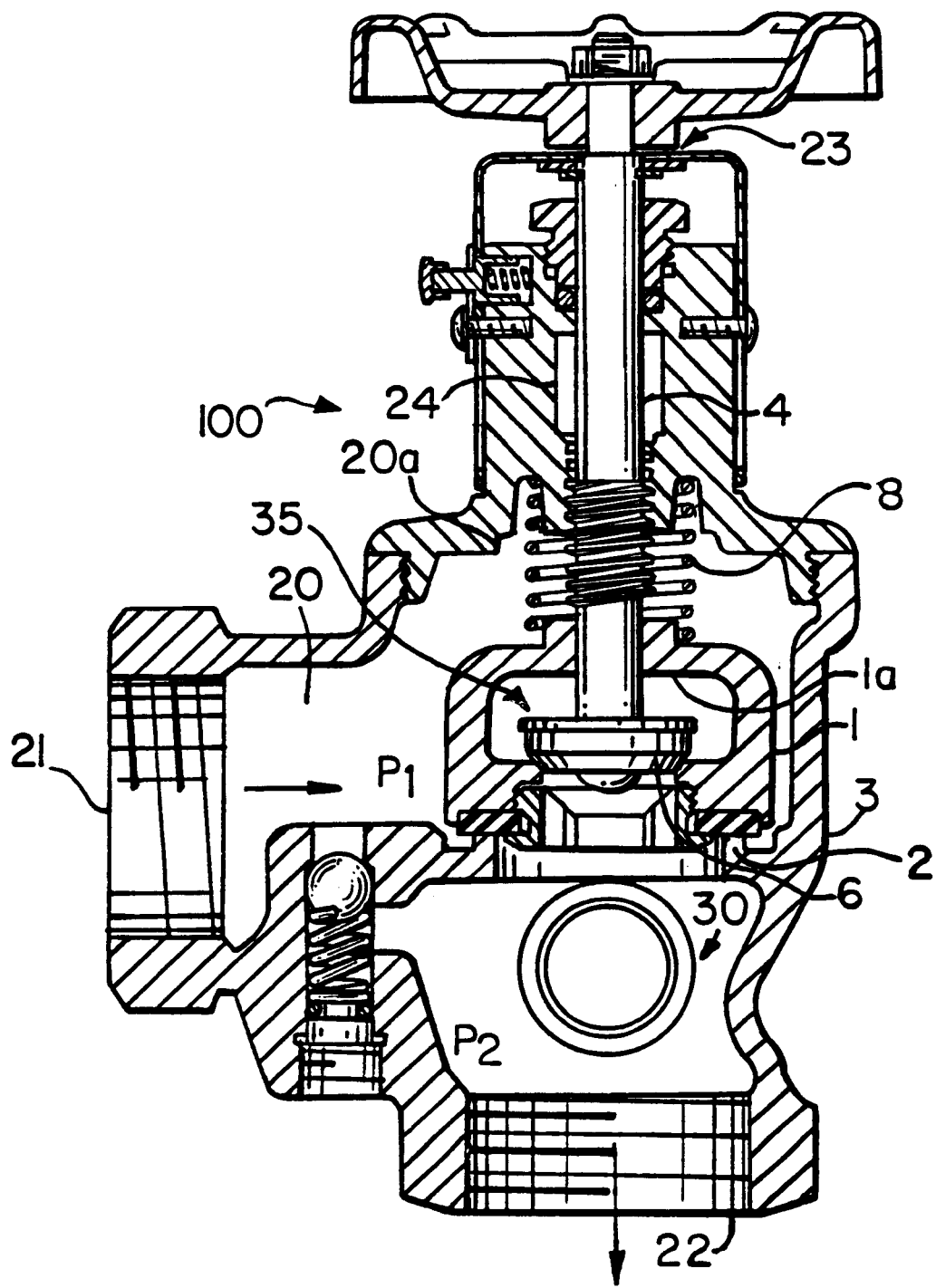
FIGS. 2a–2c illustrate the apparatus of the present invention, shown in three alternative operative states, with FIG. 2a showing the apparatus in a fully closed position.

Generally, the apparatus is capable of three modes or states of operation. FIG. 2a shows the apparatus in a fully closed position, which is the normal operating condition in a functional fire control sprinkler system. In this position a valve poppet 1 is in sealing contact with a main valve seat 2, which is incorporated into the valve body 3. The valve seat 2 may be formed as an integral part of the valve body 3 or as a separate element suitably inserted into the valve body 3. In this fully closed position, flow of fluid from the inlet to the outlet is fully blocked.

The poppet 1 is held in sealing contact with the main valve seat 2 by a combination of the existence of a differential pressure ($\Delta p = P_1 - P_2$, $P_1 > P_2$, where $p_1$ is the inlet, or supply, fluid pressure, and $P_2$ is the outlet, or drain, fluid pressure); a force from a partially compressed spring 8; and a force exerted by a screw element 4 of the device, which force is transmitted via a test sealing element 6. With the device in this condition, flow is completely blocked from the inlet to the outlet.

Periodically it is necessary to test the alarm devices in a fire protection system. This test is necessary to verify that the alarm devices will sound if a flow of extinguishing fluid occurs in the system, even if only one fire sprinkler head should activate. To accomplish this, a flow of the extinguishing fluid, which is usually water, is allowed to pass through an orifice of a size (diameter) equivalent to the smallest size sprinkler head in the system, located downstream of the alarm test and drainage apparatus.

Figure 2B:
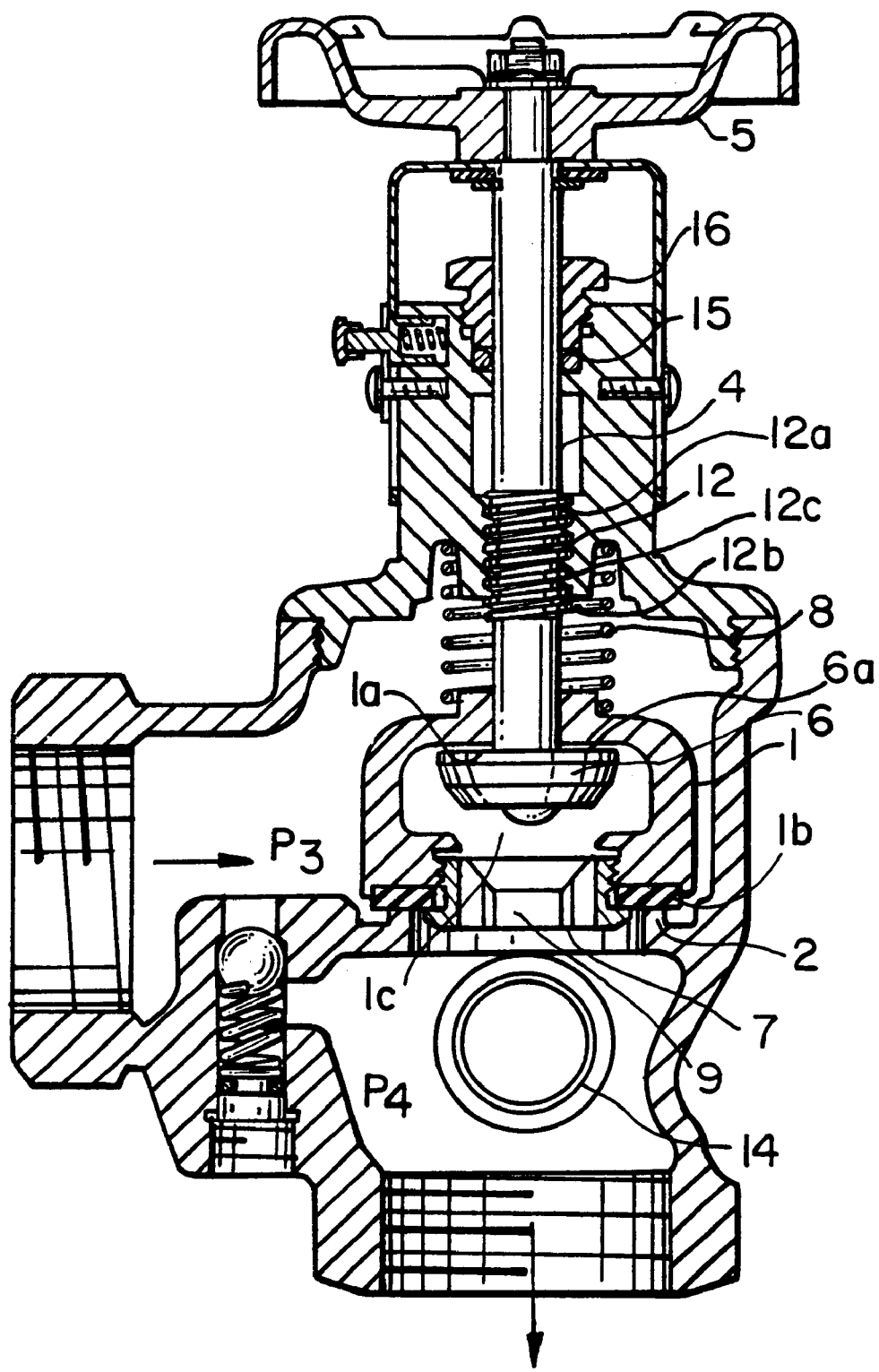

FIG. 2b shows the apparatus of the present invention in a "test" condition or mode. Here the screw element 4 has been partially retracted by rotating a handwheel 5 until the valve seat 6 is sufficiently withdrawn to allow free fluid flow through an orifice 7.

In a preferred embodiment of the apparatus, the orifice 7 is not permanently fixedly attached and is removable, so that alternatively, orifices of different sizes (diameters) can be used. The orifice 7 can either be inserted and/or changed by a person installing the apparatus on site, or it can be replaced or changed by the distributor of the apparatus or at the manufacturing facility prior to shipment. One advantage of having the interchangeable orifice is that it can quickly and easily be changed or replaced if, for example, the wrong choice of orifice size has initially been made, or it is later desired to switch to a different orifice size. The most frequently used orifice sizes for fire control sprinkler systems include ⅜", ⁷⁄₁₆", ½", ¹⁷⁄₃₂", ⅝" and ¾". Any of these orifice sizes can be supplied depending upon the size of the main valve.

In one preferred embodiment of the apparatus, the orifice 7 is also used to hold a sealing member 1b to the poppet 1. In alternative embodiments thereof, the poppet 1 is drilled with the appropriate orifice size and the sealing element 1b is a Teflon® ring that is attached by bonding, cementing, or gluing it to the poppet. In yet another alternative embodiment, the sealing element 1b is integrally formed or molded together with the poppet.

In the "Test" mode the poppet 1 remains in contact with the valve seat 2, held there by the combined action of the differential pressure $p_3 > p_4$ and the force exerted by the partly compressed spring 8. Flow then exists only via the orifice port 9.

If flow through the main valve seat 2 occurs, a false positive test condition results.

In order to ensure that fluid flow occurs only through the orifice 7 and that no other leakage occurs, it is important that on withdrawing the screw 4 to the test position that the upper surface 6a of the test valve seat does not come into contact with the underside of the poppet surface 1a, otherwise the poppet will be raised prematurely and will cause leakage through the main valve seat.

To prevent such a leakage condition from occurring through an inadvertent over-opening of the screw 4, alternatively, means are provided whereby it can be determined that the device is in the test mode, so that the screw element 4 is not withdrawn further until the test is completed, or means, such as an auto-lock feature is provided, to automatically and directly prevent further withdrawal of the screw element 4. Both of these means are discussed further hereinbelow.

Figure 2C:
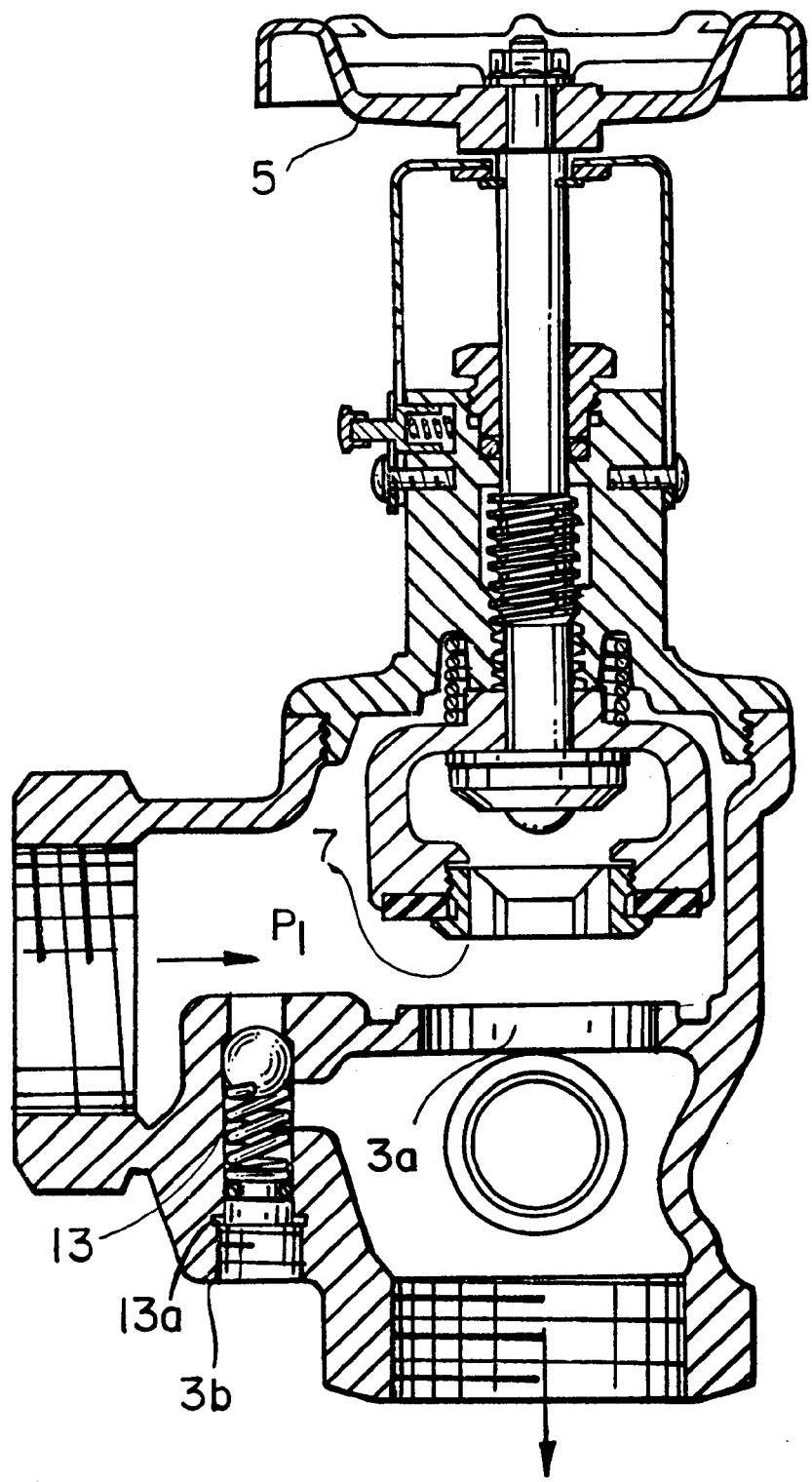
Figure 3A:
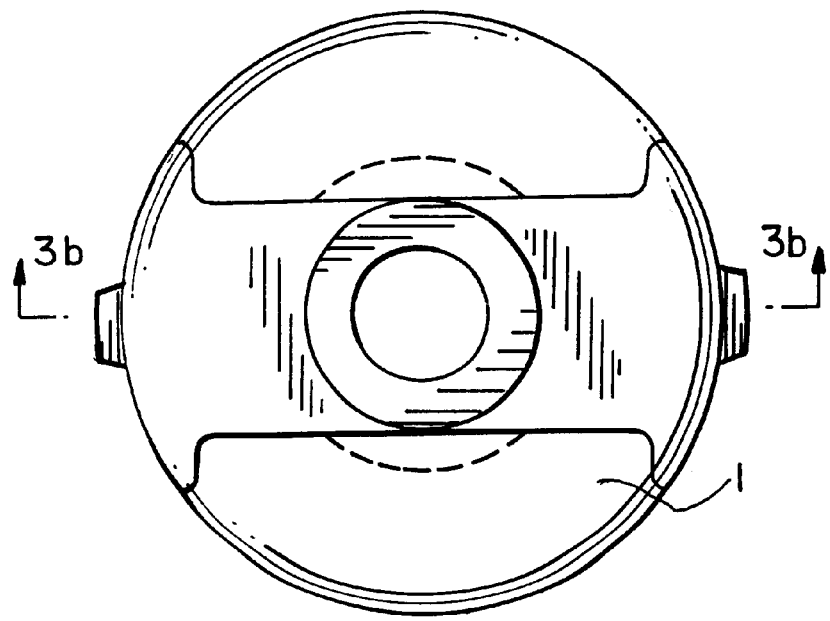
FIGS 3a and 3b illustrate the single valve and poppet of the apparatus of the present invention, with FIG. 3a showing an overhead plan view of the device.
Figure 3B:
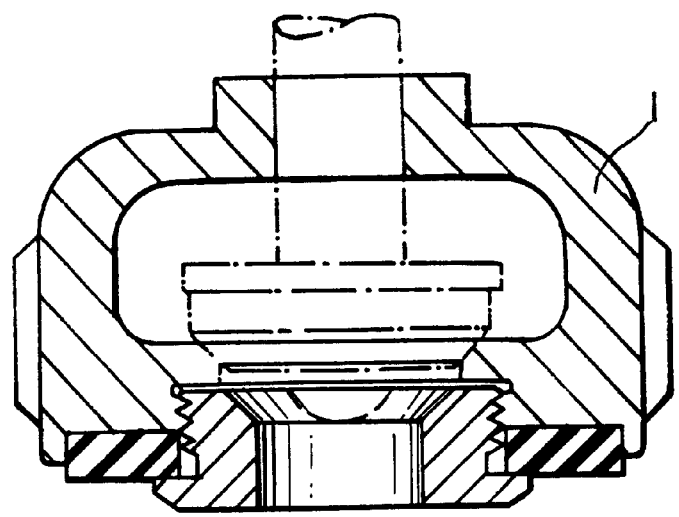

FIG. 2c shows the valve in the full open or drain condition or mode, in which condition full discharge is allowed through the main valve body opening 3a and the orifice 7.

In order to return the device to the fully closed position of FIG. 2a, the valve handle 11 is rotated in the opposite direction to advance the screw element 4 towards the main valve seat 2. During closing of the valve, as the device is restored to the position shown in FIG. 2b, the spring 8 and the differential pressure $p_3 > p_4$ will act to seat the poppet 1 on the main valve seat 2, so that a seal is immediately developed and very little if any, force needs to be exerted by the screw element 4 via the test seal element 6 to effect a positive seal between the poppet 1 and the main seat 2. In this situation, very little effort is required to close the device.

Correspondingly opening the valve to the position of FIG. 2c is also easier than for a globe valve of the same size. This arises from two factors. As stated before, the force that is generated in the screw element 4 while closing the test seat 6 against the orifice opening 1c of the poppet 1 is very small and consequently the thrust between the screw element 4 and the threaded portion of the valve cap 12a is low so that the torque needed to initially move the screw element 4 is low, further as the orifice opening 7 is opened to the flow the differential pressure across the poppet 1 decreases thus requiring less pulling force by the screw element 4 to open the main valve, which in turn reduces the torque needed to move the handwheel 5.

One embodiment of the device optionally features providing an integral pressure relief valve 13, as shown in FIG. 2c.

Addition of the pressure relief valve 13 provides a number of advantages, as follows.

In gridded wet pipe fire protection systems the system pressure can increase through thermal expansion of the entrapped water. National Fire Protection Article (NFPA) 13 requires that such systems be fitted with a pressure relief valve of minimum size ¼" to relieve when the pressure exceeds 175 psi.

The invention incorporates an integral pressure relief device such as assembly 13 which will automatically relieve the upstream pressure $P_1$ when it exceeds 175 psi. The pressure relief device 13 can be factory set at a higher pressure approximately 210 psi. This will allow the installer to water test the installed fire protection system to 200 psi which is an NFPA requirement. On completion of the system pressure test, the pressure relief device 13 is adjusted by screwing back the adjustment screw 13a until it is flush with the edge of the casting 3b, after which the pressure relief device will relieve at pressures not exceeding 175 psi as required by the regulations.

The sprinkler test device according to the present invention can also incorporate sight glasses 14, which are required to allow an inspector to establish that flow is occurring in the test condition. The general construction of the sprinkler test device will likely incorporate a bronze body 3, with threaded or other end preparations for the connection to inlet and outlet piping. Alternatively the body may be made of a ferrous material but the main valve seat 2 will either be inlaid in a suitably corrosion resistant material or take the form of a separate sealing ring made from a sufficiently corrosion resistant alloy such as bronze or stainless steel, suitably attached to the valve body 3.

The valve cap 12 is also preferably made from a sufficiently non-corrosive material such as bronze. The spring 8 and the screw element 4 are also made of suitably corrosion-resistant materials, as are the valve poppet 1 and the orifice 7. The valve cap 12 incorporates a suitable stem seal 15 and an adjustable packing gland 16, which are also made from a suitable corrosion-resistant material.

The test seal 6 and the poppet seal 1b are made from a suitable sealing material, such as Teflon or synthetic rubber.

The valve cap 36 is attached to the valve body 3 by threaded or other means and may incorporate means to prevent leakage, such as thread sealant or a seal, if necessary. The operating handwheel 5 is of a suitable size, but generally is smaller than similar size globe valves due to the lower operating torques needed. This handwheel 5 is made of plastic or metal suitably formed.

As stated herein above, it is necessary that the device incorporates means to ensure that on opening to the test position of FIG. 2b, leakage does not take place through the main valve seat, in which case the poppet 1 must remain undisturbed with its sealing member 1b still in sealing contact with the main valve seat 2. To ensure this, two means are appropriate.

Figure 4:
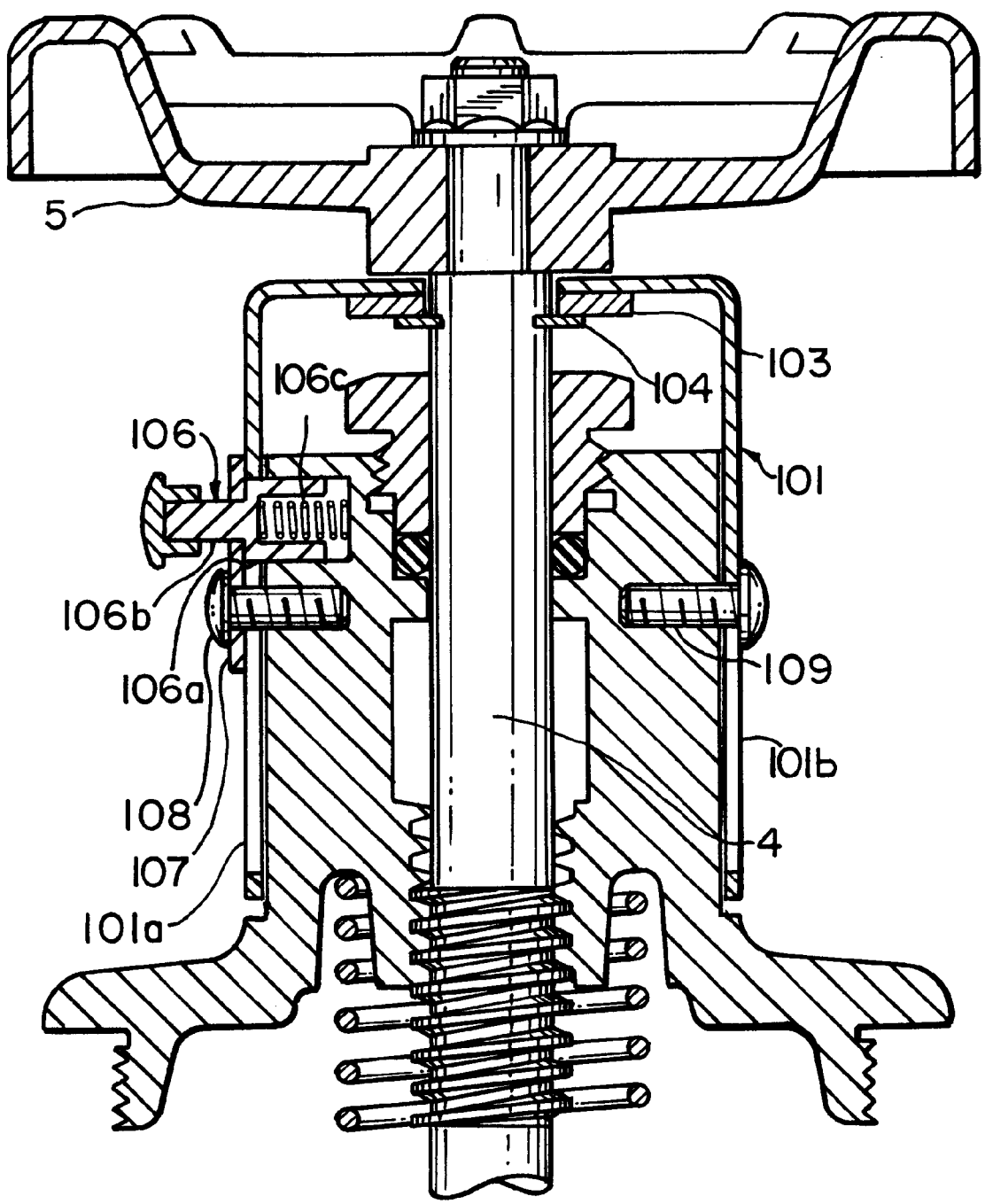
FIG. 4 is an illustration of one embodiment of the apparatus of the present invention equipped with an auto-lock feature.

In one preferred embodiment, the apparatus is fitted with an auto-lock feature, of which there are numerous possible designs, one such design being shown in FIG. 4.

In the auto-lock feature shown in FIG. 4, a 'U' shaped plate 1 is placed over the screw element 2. The screw element 2 is free to rotate within the 'U' plate. As the screw element 2 rises and falls, the 'U' shaped plate is lifted or lowered. According to the embodiment shown in FIG. 4, lifting is caused by means of a thrust washer 3 and a retaining ring or clip 4. Lifting can also be accomplished by other techniques. When the screw element 2 is moved inwards (lowered), the 'U' shaped plate is forced downwards by the underside of the handwheel element 5. The 'U' shaped plate incorporates two slots 1a and 1b. Slot 1a has different widths over its length. Slot 1b is of the same width over its length. Incorporated in the neck portion of the main device is a spring plunger arrangement 6, which engages the slot 1a. This spring plunger device 6 has a first, wide diameter 6a and a second, smaller diameter 6b. The spring plunger device is forced outwards against a special shaped plate 7, which retains the spring plunger and also acts as an indicator plate. Screw 8, which penetrates slot 1a acts to secure the plate 7 and the combination of screw 8 and the plate 1 acts together to prevent outwards shifting of the 'U' plate 1.

Plate 7 does not bind tightly against the 'U' plate 1 as sliding contact must be allowed. Screw 9, which penetrates slot 1b, acts as an indicator device and to prevent the 'U' plate 1 from shifting outwards. Screw 9 does not act tightly against the 'U' plate 1 as sliding contact must be allowed.

Figure 5:
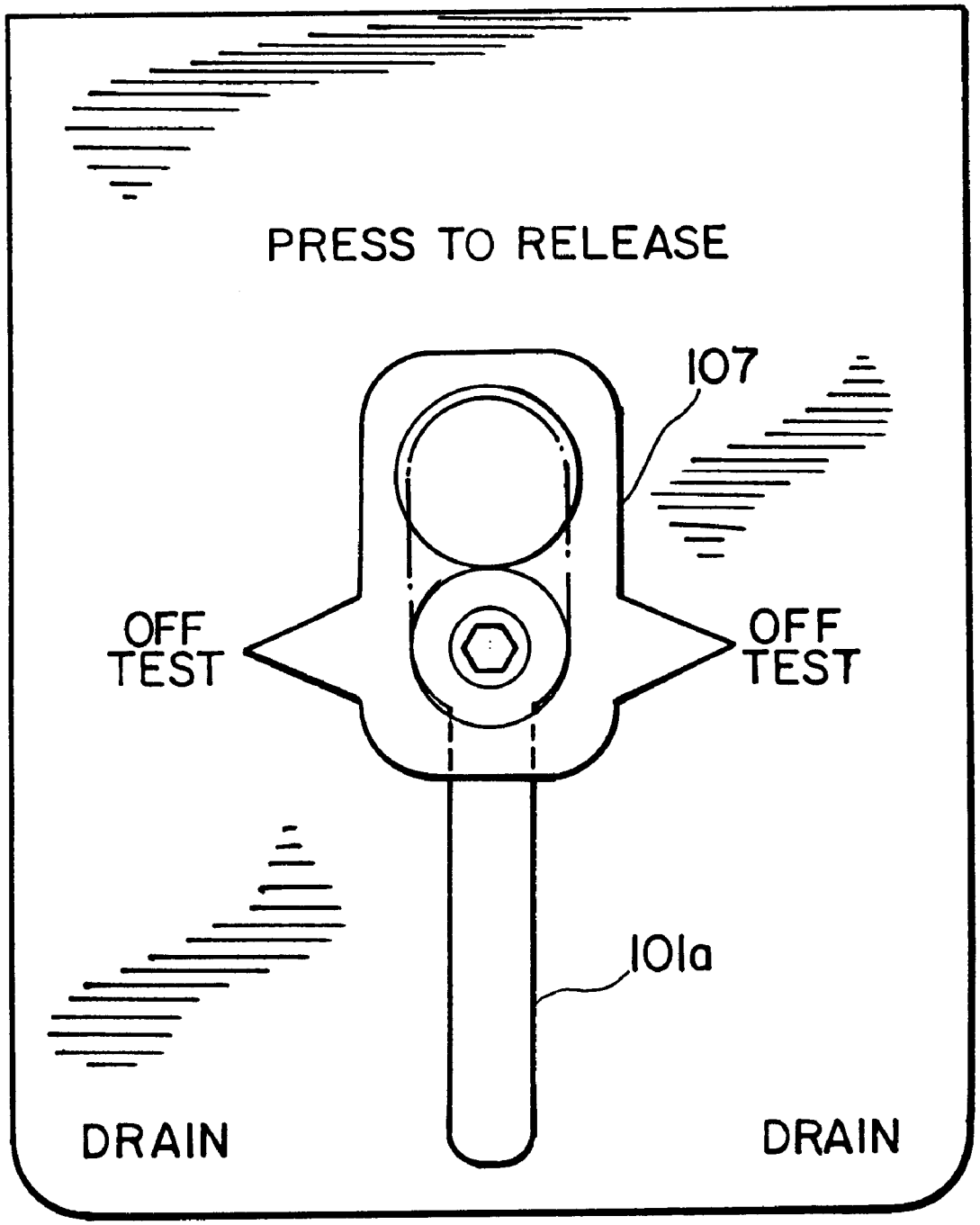
FIG. 5 is an illustration of an auto-lock mode selection means for certain embodiments of the apparatus of the present invention.

FIG. 5 shows the Test and Drain device in the closed position of FIG. 2a. In this situation the major diameter 6a of the spring plunger device 6 has penetrated the wider portion of the slot 1a. As the handwheel member 5 is rotated counter-clockwise in this case for a right hand ed screw element 2 the screw element 2 will rise upwards and in so doing lift the 'U' shaped plates 1, so that eventually the major diameter 6a of the spring plunger device 6 will come into contact with the narrower portion of slot 1a. This prevents further upward movement of the screw element 2.

In this condition the valve is now in the "test" condition of FIG. 2b, and the operator or inspector cannot accidentally open the valve beyond this point.

To move the valve to the "drain" position, the spring plunger 6 is depressed, which presents the minor diameter 6b to the slot 1a. With the spring plunger continued to be depressed, the position of the Test and Drain device is then moved to the "Drain" position of FIG. 2c.

By turning the handle element 5 in the opposite direction the reverse sequence will take place and the auto-lock feature is reset.

Instead of utilizing the auto-lock feature, it is alternatively sufficient to indicate only the position of the Test and Drain device to the operator or inspector. In such an embodiment, the spring plunger device 6 of FIG. 4 and the plate 7 of FIGS. 4 and 5, are not used and the slot 1a is of constant width. The screws 8 and 9 indicate the position of the device on the 'U' plate 1.

Advantages of the Invention

Some of the differences between several prior art devices and the apparatus of the present invention, as well as advantages of the apparatus of the present invention over the prior art, can be immediately seen from FIG. 1, which comparatively shows both left and right hand installations of the most common installation configurations for each of three prior art devices and the apparatus of the present invention. FIGS. 1a,b are left and right hand installations, respectively, of the apparatus according to U.S. Pat. No. 4,741,361 to McHugh; FIGS. 1c,d, are left and right hand installations, respectively, of the apparatus according to U.S. Pat. No. 4,655,078 to Johnson; FIGS. 1e,f are left and right hand installations, respectively, of the apparatus according to U.S. Pat. No. 4,643,224 to Rung et al; and FIGS. 1g,h are left and right hand installations, respectively, of the apparatus of the present invention.

The present invention provides certain advantages over the prior art. In comparison to the devices of McHugh and Johnson, it can be seen by reference to FIG. 1, which is a common installation configuration, that the present apparatus is more convenient to the installer and user than any of the prior devices.

When the device of McHugh is used to the left hand side of the drain riser it can be seen that the operating mechanism and indicator plate will be obstructed by the device. In many cases there will be a wall or the device will be mounted on a cabinet so that the device can only be viewed or approached from one side.

In the case of the Johnson device, an additional fitting is needed to make the connection to the drain in either arrangement.

Furthermore, the present invention allows for the easy exchange of the orifice before installation, which is not possible with either the Johnson or McHugh devices, where a replacement ball is needed and the devices must be disassembled to replace the balls.

In comparison to the device of Rung et al, which requires the use of two valves, the apparatus of the present invention employs only a single, dual-purpose valve.

The apparatus of the present invention also allows for a more compact design than is possible with the Rung et al device. This is an important consideration as often installation space is tight.

Figure 1B:
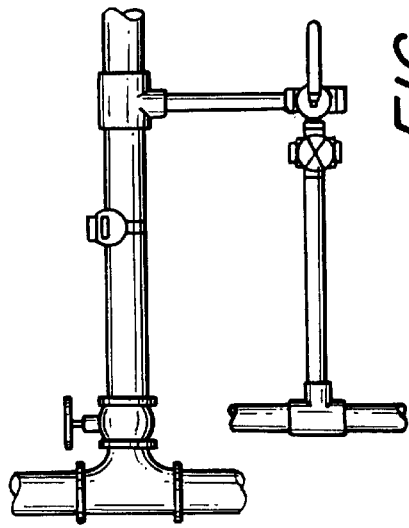
FIGS. 1a, 1b, 1c, 1d, 1e and 1f illustrate front and rear views of three prior art apparatus.
Figure 1D:
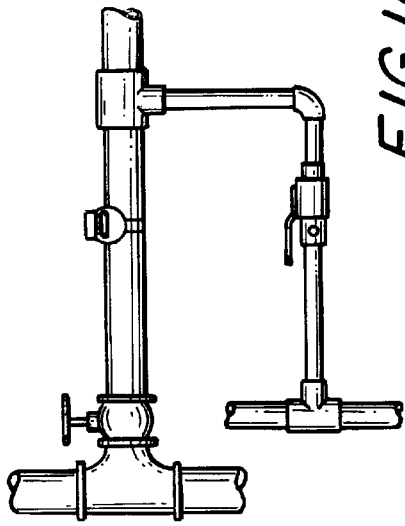
Figure 1A:
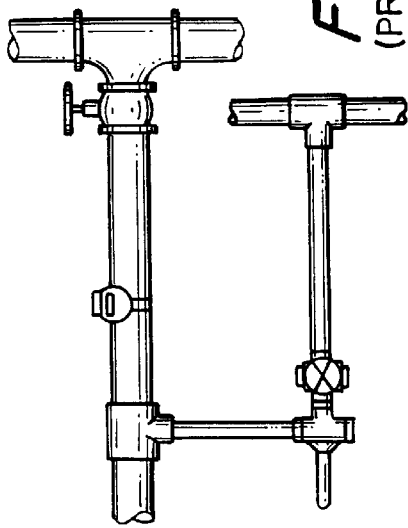
Figure 1C:
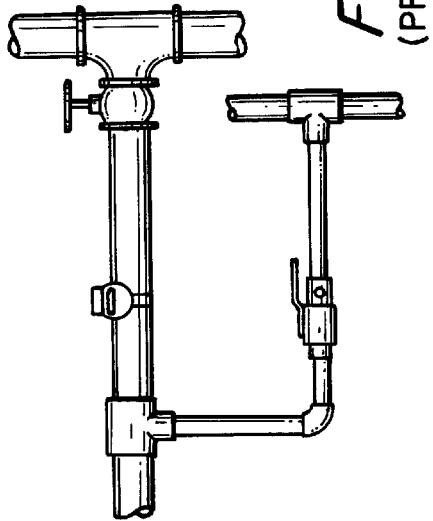
Figure 1F:
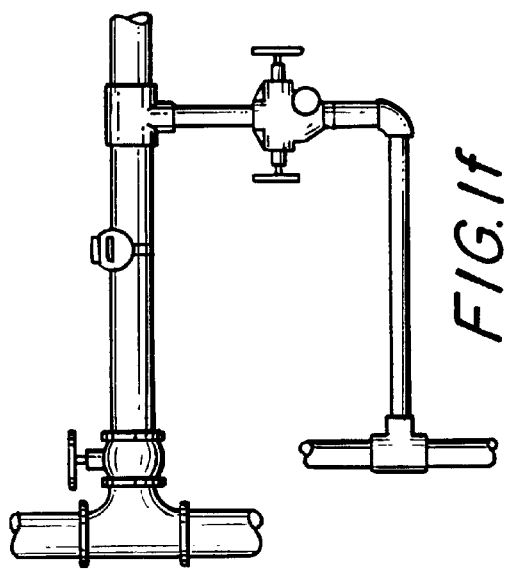
Figure 1H:
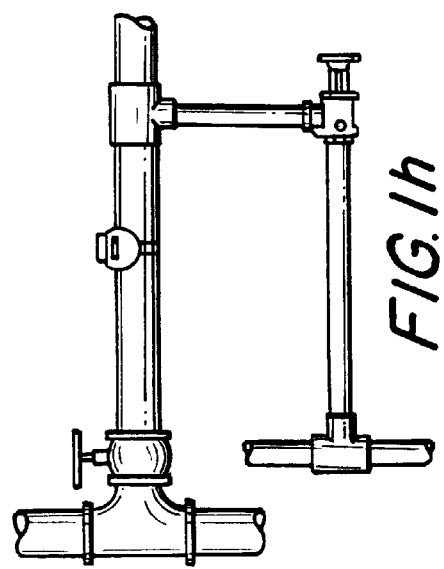
FIGS. 1g and 1h illustrate the apparatus of the present invention, as typically installed in a sprinkler type fire protection system.
Figure 1E:
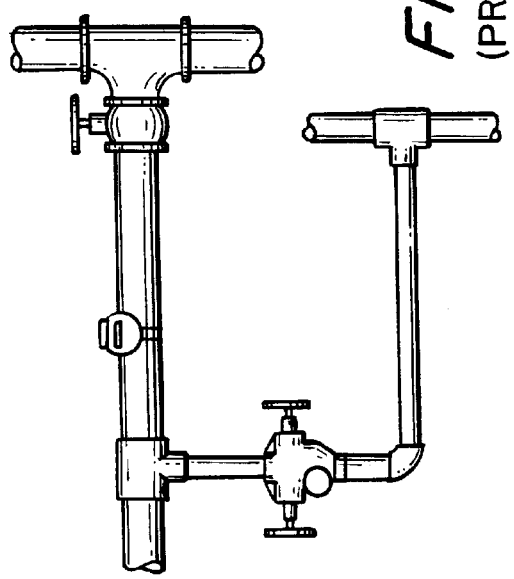
Figure 1G:
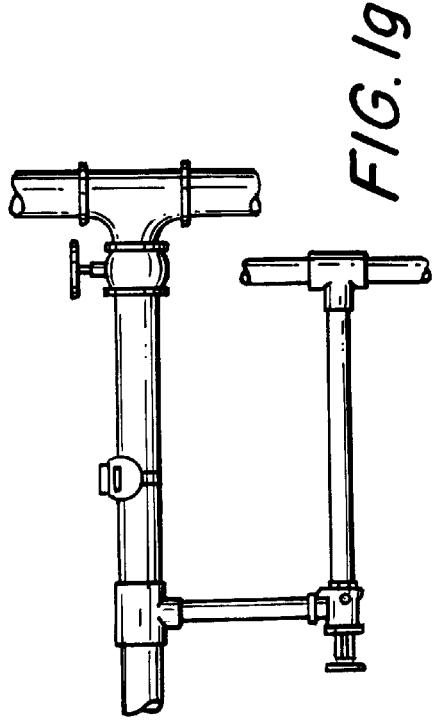

In the case of the Rung et al device, an additional fitting is required to satisfy the installation requirements, as are shown in FIGS. 1e & f.

The apparatus of the present invention, when using a screw operator design, also has an advantage over the devices of McHugh and Johnson in that the possibility of water hammer occurring is reduced, whereas when ball type devices like those of Mc Hugh and Johnson are rapidly closed or opened, this can occur.

Additional Embodiments of the Present Invention

It will be recognized by those skilled in the art that according to the above-described embodiment of the apparatus of the present invention, the screw element which raises and lowers the test seat and the main valve seat can be replaced with alternative, equivalent mechanisms, such as a sliding rod that can be raised and lowered by different methods, e.g. a lever arrangement mounted on the device or a hydraulic piston and cylinder or by a cam arrangement. In certain alternative embodiments of the present invention, the screwed element can also be actuated by a rotary actuator.

These, as well as still other alternative and equivalent embodiments, which a person of ordinary skill in the art will recognize, are within the scope of the present invention, which is determined by the following set of claims.

What is claimed is:

1. An alarm test and drainage apparatus for use in a sprinkler fire control system, wherein a system alarm test function and a system fluid drainage function are combined in the apparatus, the apparatus comprising
    a valve body; and
    valve means positioned in the valve body, said valve means being capable of being opened or closed to respectively alternatively enable and stop fluid flow through the valve body, such that fluid flow through the valve body occurs alternatively under a first set of test actuation conditions in a system alarm test mode of operation, and under a second set of fluid drainage actuation conditions in a system fluid drainage mode of operation, said valve means being of a linear spring type that utilizes a pressure differential across at least two sides thereof to bias a main valve in a closed condition when the main valve is fully closed in the test actuation condition.

2. The alarm test and drainage apparatus according to claim 1, wherein a mechanical force is utilized to open the valve means and a combination of mechanical and hydraulic forces are utilized to close the valve means from the system alarm test mode of operation and the system fluid drainage mode of operation.

3. The alarm test and drainage apparatus according to claim 2, wherein the mechanical force is provided by a spring when the valve means is closed, and the hydraulic force is provided by the fluid pressure differential.

4. The alarm test and drainage apparatus according to claim 1, wherein the valve means includes a movable valve actuation member and means for changing the position of the movable valve actuation member.

5. The alarm test and drainage apparatus according to claim 1, wherein when the apparatus is performing the system alarm test function under the first set of test actuation conditions, the valve means opens a first size outlet opening, and when the apparatus is performing the system fluid drainage function under the second set of drainage actuation conditions, the valve means opens a second size outlet opening.

6. The alarm test and drainage apparatus according to claim 5, wherein the second size outlet opening of the valve means in the fluid drainage mode of operation of the apparatus is larger than the first size outlet opening of the valve means in the fluid system alarm test mode of operation of the apparatus.

7. The alarm test and drainage apparatus according to claim 4, wherein the movable valve actuation member is a chamber defining a volume for containing a volume of a fluid, the fluid chamber having
    a fluid chamber inlet opening and
    a fluid-sealable fluid chamber outlet opening therein, with the fluid chamber outlet opening being the same size as the first size outlet opening of the valve means for the system alarm test mode of operation, such that
        when the apparatus is in the system alarm test mode of operation, the valve actuation member is positioned to seal the second size outlet opening of the valve means, and fluid flows into the fluid chamber through the fluid chamber inlet opening, the fluid chamber outlet opening is unsealed, and fluid flows out through the fluid chamber outlet opening; and
        further such that when the apparatus is in the system drainage mode of operation, the valve actuation member is moved to unseal the second size outlet opening of the valve means.

8. The alarm test and drainage apparatus according to claim 6, wherein the movable valve actuation member is a fluid chamber having
    a fluid chamber inlet opening and
    a movable sealable fluid chamber outlet opening therein, with the fluid chamber outlet opening being the same size as the first size outlet opening of the valve means for the system alarm test mode of operation, such that
        when the apparatus is in the system alarm test mode of operation, the valve actuation member itself seals the second size outlet opening of the valve means, fluid flows into the fluid chamber through the fluid chamber inlet opening therein, the fluid chamber outlet opening is unsealed, and fluid flows out through the fluid chamber outlet opening; and further such that when the apparatus is in the system drainage mode of operation, the valve actuation member is itself moved to unseal the second size outlet opening of the valve means.

9. The alarm test and drainage apparatus according to claim 4, wherein the size of the valve opening when the apparatus is performing the system alarm test function is determined by the size of a test outlet orifice.

10. The alarm test and drainage apparatus according to claim 6, wherein the first size outlet opening is smaller than the second size outlet opening.

11. The alarm test and drainage apparatus according to claim 1, further comprising:
    a movable sealing member; and
    first and second fluid chambers in the apparatus that separate and respectively communicate with a fluid inlet port and a main fluid outlet port, and which are separated by the movable sealing member that contains a test orifice port having a size less than the size of the main fluid outlet port.

12. The alarm test and drainage apparatus according to claim 11, wherein the test orifice port has a variable size.

13. The alarm test and drainage apparatus according to claim 11, wherein the test orifice port is removable.

14. The alarm test and drainage apparatus according to claim 4, wherein a test valve seat is utilized to seal the test orifice port.

15. The alarm test and drainage apparatus according to claim 14, wherein a replaceable test port is used to secure a sealing seat ring or washer to the sealing member.

16. The alarm test and drainage apparatus of claim 11, wherein a stem member is connected to a test valve seal, which seals against the test orifice port and which can be operated via the stem member to allow for testing of the fire protection system.

17. The alarm test and drainage apparatus of claim 1, wherein the apparatus is alternatively in one of three positions selected from the group consisting of: (a.) open, test mode; (b.) open drain mode; and (c.) closed.

18. The alarm test and drainage apparatus according to claim 1, further comprising a pressure relief valve for controlling the maximum system pressure.

19. The alarm test and drainage apparatus according to claim 1, further comprising at least one sight glass for observing the occurrence of flow through the apparatus.

20. The alarm test and drainage apparatus according to claim 1, further comprising indicia means for indicating each of the conditions that the apparatus is capable of assuming.

21. The alarm test and drainage apparatus according to claim 20, wherein the conditions include a closed condition, a test condition, and a drain condition.

22. The alarm test and drainage apparatus according to claim 20, further comprising
an automatic or self-locking member to prevent inadvertent opening of the apparatus to a fully-open drain condition when in the test condition.

23. A combined alarm test and drainage apparatus for a sprinkler fire protection system comprising:
a) a valve body, having
an exterior and
a hollow interior,
an exterior surface with a plurality of openings therein, the openings extending between the exterior and the interior of the valve body,
the valve body further having
a horizontal axis and
a vertical axis,
the valve body having a hollow interior defining
a first chamber and
a second chamber therein, such that the first and second chambers are contiguous to and in communication with one another, and further such that
the first chamber is in communication with a fluid inlet opening in the exterior surface of the valve body, and
the second chamber is in communication with a fluid outlet opening in the exterior surface of the valve body, the valve body further having
an opening in the exterior surface thereof, with a channel therethrough, extending between the first chamber in the interior of the valve body and the exterior of the valve body;
b) a main valve seat positioned inside the valve body and separating the first and second chambers and permitting fluid flow therethrough during either a test procedure or a discharge procedure;
c) a valve poppet, positioned inside the valve body, and having
a vertical axis coaxial with the vertical axis of the valve body, such that the valve poppet is vertically movable only during the discharge procedure between a first position wherein the valve poppet is in contact with the main valve seat, and a second position wherein the valve poppet engages an upper wall portion of the first chamber in the interior of the valve body, permitting a discharge fluid flow between the first and second chambers during the discharge procedure, and further such that the valve poppet itself defines
an interior valve poppet chamber therein, the valve poppet chamber having a test orifice therein, at a lower end of the valve poppet, the test orifice being coaxial with the vertical axis of the valve poppet and in communication with the second chamber in the interior of the valve body, and the valve poppet having
an opening therein at an upper end of the valve poppet, opposite the lower end of the valve poppet with the test orifice therein;
d) a screw element, having
a distal end,
a proximal end,
a mid-section therebetween, and
a longitudinal axis coaxial with the vertical axis of the valve body, the screw element further having:
a shank portion at and forming the proximal end of the screw element, the shank portion extending through the opening in the valve body;
a threaded portion at the mid-section of the screw element, for cooperation with a receptively threaded portion in the channel of the valve body;
a test valve element at the proximal end of the screw element, the test valve element being capable of alternatively being moved between a first position wherein the test valve element sealingly cooperates with a test valve seat at the lower end of the poppet, and a second position wherein the test valve element is in communication with an under surface of the upper end of the poppet, and
screw element control means, disposed at the distal end of the screw element, outside the valve body, for turning the screw element so as to alternatively extend it into and withdraw it from the valve body;
e) a spring, surrounding the screw element between its threaded midsection and its distal end, the spring being positioned between an exterior surface of the upper end of the valve poppet and an inner surface of an upper end of the first chamber in the valve body, the spring having
a first precompressed default condition wherein the test valve seat rests against an interior surface of the lower end of the valve poppet, inside the valve poppet chamber, to seal the test orifice in the lower end of the valve poppet, and wherein the poppet itself rests against the main valve seat in the valve body between the first and second interior chambers of the valve body;
wherein a pressure differential across at least two sides of the valve poppet biases the valve poppet in a closed condition when the main valve seat separating the first and second chambers is fully closed in the first precompressed default condition;
a second compressed condition wherein the screw element is at least partially withdrawn through the channel in the valve body, and the test valve is disposed away from the inner surface of the lower end of the valve poppet, thereby leaving the orifice in the lower end of the valve poppet in an open condition; and
a third compressed condition with the valve poppet itself then being raised away from the main valve seat and disposed in communication with the inner surface of the upper end of the first chamber in the valve body.

24. The combined alarm test a drainage apparatus for a sprinkler fire protection system according to claim 23, further comprising a pressure relief valve disposed in the valve body.

25. The combined alarm test and drainage apparatus for a sprinkler fire protection system according to claim 24, wherein the pressure relief valve is positioned between and fluid-sealingly separates the first and second chambers of the valve body when the fluid pressure in the first chamber is less than a predetermined set relief pressure; and wherein when the fluid pressure in the first chamber of the valve body exceeds the predetermined set relief pressure, the relief valve opens to allow relief of the excess pressure by causing fluid to be diverted directly to the second chamber, by-passing the poppet, and out through the fluid outlet in the second chamber of the valve body.

26. The combined alarm test and drainage apparatus for a sprinkler fire protection system according to claim 25, wherein the predetermined set relief pressure is adjustable and is set and adjusted by an adjustment screw.

27. The combined alarm test and drainage apparatus for a sprinkler fire protection system according to claim 26, wherein the adjustment screw is spring-tensioned.

28. The combined alarm test and drainage apparatus for a sprinkler fire protection system according to claim 24, further including at least one sight glass to enable observation of fluid flow into and out of the second chamber of the valve body.

29. The combined alarm test and drainage apparatus for a sprinkler fire protection system according to claim 24, further including a fluid-tight seal surrounding the shank portion of the screw element in the passage through the bonnet of the valve body.

30. The combined alarm test and drainage apparatus for a sprinkler fire protection system according to claim 24, further including a fluid-tight packing gland surrounding the shank portion of the screw element at the exterior of the valve body.

31. The combined alarm test and drainage apparatus for a sprinkler fire protection system according to claim 1, further comprising:
   a valve actuation adapted to actuate the valve means alternatively between an open and a closed position.

32. An alarm test and drainage apparatus for use in a sprinkler fire control system, wherein a system alarm test function and a system fluid drainage function are combined in the apparatus, the apparatus comprising:
   a valve body; and
   a valve device positioned in the valve body and having:
      a first linearly movable valve member which facilitates fluid flow during a test procedure; and
      a second linearly movable valve member which facilitates fluid flow during a drainage procedure.

* * * * *